United States Patent
Kim et al.

(10) Patent No.: US 12,114,035 B2
(45) Date of Patent: Oct. 8, 2024

(54) METHOD OF ASSIGNING IR CODE SET OF TV USING REMOTE CONTROL, AND SYSTEM FOR SUPPORTING SAME

(71) Applicant: OHSUNG ELECTRONICS CO., LTD., Busan (KR)

(72) Inventors: Sang Tae Kim, Daegu (KR); Sang Hoon Lee, Daegu (KR)

(73) Assignee: OHSUNG ELECTRONICS CO., LTD., Busan (KR)

( * ) Notice: Subject to any disclaimer, the term of this patent is extended or adjusted under 35 U.S.C. 154(b) by 0 days.

(21) Appl. No.: 18/301,550

(22) Filed: Apr. 17, 2023

(65) Prior Publication Data
US 2024/0205487 A1    Jun. 20, 2024

(30) Foreign Application Priority Data
Dec. 14, 2022    (KR) ........................ 10-2022-0175146

(51) Int. Cl.
*H04N 21/422*    (2011.01)
*H04N 21/485*    (2011.01)

(52) U.S. Cl.
CPC .  *H04N 21/42221* (2013.01); *H04N 21/42226* (2013.01); *H04N 21/485* (2013.01)

(58) Field of Classification Search
CPC ....... H04N 21/42221; H04N 21/42226; H04N 21/485
See application file for complete search history.

(56) References Cited

FOREIGN PATENT DOCUMENTS

| KR | 10-2009-0032229 A | 4/2009 |
| KR | 10-2010-0110249 A | 10/2010 |
| KR | 10-2015-00071944 A | 6/2015 |
| KR | 10-1816723 B1 | 1/2018 |
| KR | 10-2058386 B1 | 12/2019 |
| KR | 10-2021-0080005 A | 6/2021 |

OTHER PUBLICATIONS

Korean Office Action dated May 17, 2024 for corresponding Korean Application No. 10-2022-0175146 and English translation.

*Primary Examiner* — Anthony Bantamoi
(74) *Attorney, Agent, or Firm* — Pearne & Gordon LLP (57) ABSTRACT

A method of assigning an IR code set of a TV using a remote control, and a system for supporting the method. the method includes entering, by the remote control, a code set auto-scan mode when a set button is manipulated, and transmitting a scan mode entry request signal to a set-top box; entering, by the set-top box, the code set auto-scan mode and transmitting a scan mode entry completion signal to the remote control; outputting, by the set-top box, the number of a plurality of the IR code sets of an IR database (IRDB) received from the remote control on the TV; transmitting, by the set-top box to the remote control, an IR code set transmission request signal for requesting transmission of an IR signal of any one particular IR code set among the IR code sets; and transmitting the IR signal by the remote control.

8 Claims, 7 Drawing Sheets

Check if there is
change in TV volume UI

Recognized device : LG

| 1 | 2 | 3 | 4 | 5 | 6 | 7 | 8 |

Fig. 2

Check if there is
change in TV volume UI

Recognized device : LG

| 1 | 2 | 3 | 4 | 5 | 6 | 7 | 8 |

METHOD OF ASSIGNING IR CODE SET OF TV USING REMOTE CONTROL, AND SYSTEM FOR SUPPORTING SAME

CROSS REFERENCE TO RELATED APPLICATION

The present application claims priority to Korean Patent Application No. 10-2022-0175146, filed Dec. 14, 2022, the entire contents of which is incorporated herein for all purposes by this reference.

TECHNICAL FIELD

The present disclosure relates to a method of assigning an IR code set of a TV using a remote control, and a system for supporting the method. More particularly, the present disclosure relates to a method of assigning an IR code set by using TV manufacturer information, and a system for supporting the method.

BACKGROUND

A set-top box (STB) is a device that connects to a TV, receives external signals, converts the signals appropriately, and displays the content of the signals on the TV screen. The set-top box receives signals that are not general TV broadcasting radio waves, for example, IPTV, cable TV, or satellite TV signals, and displays the received signals on the TV screen.

Generally, a set-top box comes with a remote control as a package, and users manipulate the remote control to remotely control the set-top box.

Generally, a remote control for a set-top box is designed to control only the set-top box. This means that a separate remote control is needed to control a TV, causing the inconvenience of having two remote controls. For example, a remote control of a set-top box needs to be manipulated to change the channels on the set-top box, and a remote control of a TV needs to be manipulated to change the volume on the TV. To solve this inconvenience, a remote control capable of controlling both a set-top box and a TV is widely used.

The remote control is equipped with an input module and a communication module. The input module is equipped with multiple buttons including a set-top box power button for turning on or off the power of a set-top box, a TV power button for turning on or off the power of a TV, a TV volume change button, a set-top box volume change button, and a set-top box channel change button.

The communication module transmits remote control signals corresponding to the respective buttons when the the remote control buttons are manipulated, so that the TV or set-top box is remotely controlled.

However, in order to control the TV with the remote control, the remote control needs to store an IR code set assigned to the TV among IR code sets. When the IR code set assigned to the TV is not stored, the remote control cannot remotely control the TV.

The foregoing is intended merely to aid in understanding the background of the present disclosure, and is not intended to mean that the present disclosure falls within the purview of the related art that is already known to those skilled in the art.

Documents of Related Art are as follows.
(Patent Document 1) Korean Patent Application Publication No. 2010-0110249 (title: TV PROGRAM INFORMATION MANAGEMENT METHOD AND REMOTE CONTROL)
(Patent Document 2) Korean Patent Application Publication No. 2009-0032229 (title: OPERATING METHOD OF DISPLAY DEVICE CONNECTED TO EXTERNAL INPUT DEVICE, AND DISPLAY DEVICE EMPLOYING THE METHOD)

BRIEF SUMMARY

The present disclosure is directed to providing a method of assigning a remote control an IR code set for controlling a TV.

In addition, the present disclosure is directed to providing a method of assigning one of a plurality of IR code sets to a remote control.

In addition, the present disclosure is directed to providing a method of assigning an IR code set to a remote control by a user's simple manipulation of the remote control.

In addition, the present disclosure is directed to providing a method of receiving the latest IRDB data from an external server and applying the same.

According to the present disclosure, there is provided a method of assigning an IR code set of a TV using a remote control, the method including: entering, by the remote control, a code set auto-scan mode when a set button is manipulated, and transmitting a scan mode entry request signal for requesting entry into the code set auto-scan mode to a set-top box; entering, by the set-top box, the code set auto-scan mode in response to the scan mode entry request signal, and transmitting a scan mode entry completion signal corresponding to the scan mode entry request signal to the remote control; outputting, by the set-top box, the number of a plurality of the IR code sets of an IR database (IRDB) received from the remote control on the TV; transmitting, by the set-top box to the remote control, an IR code set transmission request signal for requesting transmission of an IR signal of any one particular IR code set among the IR code sets, which are at least two in number, constituting the IRDB; and transmitting, by the remote control, the IR signal of the particular IR code set.

According to the method of assigning the IR code set of the TV using the remote control and the system for supporting the method according to the present disclosure, the IR code set of the TV is automatically assigned by a user's minimal manipulation of the remote control. That is, according to the present disclosure, any one of a plurality of IR code sets is assigned to the remote control, and when necessary, the latest IRDB data is received from the external server and assigned to the remote control.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

The aforementioned and additional aspects of the present disclosure will be more apparent through an exemplary embodiment described with reference to the accompanying drawings. Hereinafter, the embodiment of the present disclosure will be described in detail so that those skilled in the art can easily understand and reproduce the embodiment.

Figure 1A:
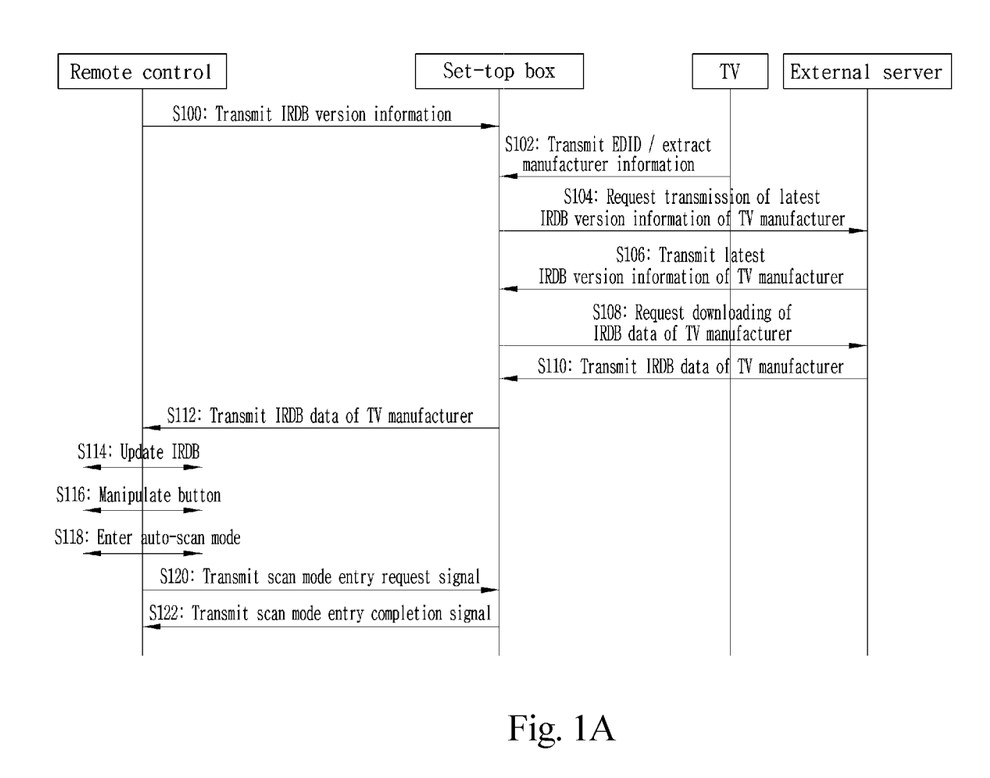
FIGS. 1A and 1B show a method of assigning an IR code set of a TV using a remote control according to an embodiment of the present disclosure.
Figure 1B:
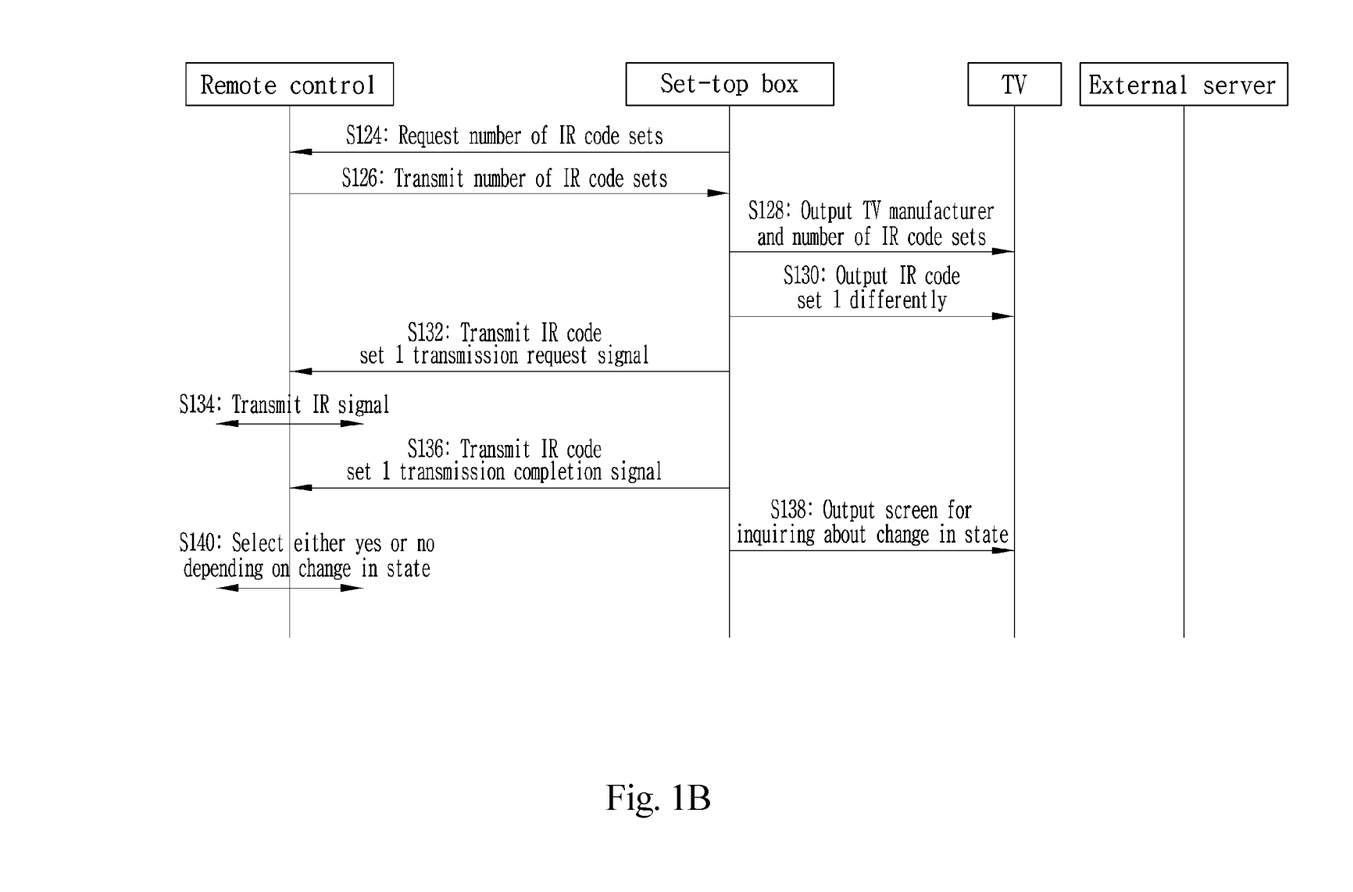

FIGS. 1A and 1B show a method of assigning an IR code set of a TV using a remote control according to an embodiment of the present disclosure. Hereinafter, the method of assigning the IR codes of the TV using the remote control according to the embodiment of the present disclosure will be described in detail with reference to FIGS. 1A and 1B.

As shown in FIGS. 1A and 1B, the method of assigning the IR code set of the TV using the remote control is performed by the operations of the remote control, a set-top box, the TV, and an external server. In particular, FIGS. 1A and 1B show a case in which an IR database (IRDB) is stored in the remote control, and the IRDB includes at least two IR code sets.

In step S100, the remote control transmits version information of the stored IRDB to the set-top box.

In step S102, the set-top box extracts manufacturer information of the TV connected thereto. For example, the set-top box is connected to the TV via an HDMI cable, and the TV manufacturer information is extracted from extended display identification data (EDID) information received through the HDMI cable.

In step S104, the set-top box makes a request to the external server for the latest IRDB version information of the extracted TV manufacturer.

In step S106, the external server transmits the latest version information of the TV manufacturer to the set-top box.

In step S108, the set-top box compares the IRDB version information received from the remote control with the IRDB version information received from the external server. When the version of the IRDB received from the external server is higher than the version of the IRDB received from the remote control, the set-top box makes a request to the external server for downloading the latest version of IRDB data.

In step S110, the external server transmits the latest version of IRDB data to the set-top box.

In step S112, the set-top box transmits the received latest version of IRDB data to the remote control.

In step S114, the remote control updates the stored IRDB with the received IRDB data.

In step S116, a user manipulates the buttons of the remote control. Regarding the present disclosure, the buttons are at least two in number, for example, "Power+OK" buttons. The remote control may make a request for entering a code set auto-scan mode in a different manner.

In step S118, when a button is manipulated, the remote control enters the code set auto-scan mode.

In step S120, the remote control transmits a scan mode entry request signal to the set-top box to request the entry into the code set auto-scan mode.

In step S122, the set-top box enters the scan mode in response to the received scan mode entry request signal and transmits, to the remote control, a scan mode entry completion signal indicating the completion of entry into the code set auto-scan mode.

In step S124, the set-top box makes a request to the remote control for the number of IR code sets assigned to the TV manufacturer included in the IRDB.

In step S126, the remote control transmits the number of IR code sets assigned to the TV manufacturer, to the set-top box. For example, the remote control may inform the set-top box that the number of IR code sets is "8".

In step S128, the set-top box outputs the TV manufacturer and IR code set numbers to the connected TV.

Figure 2:
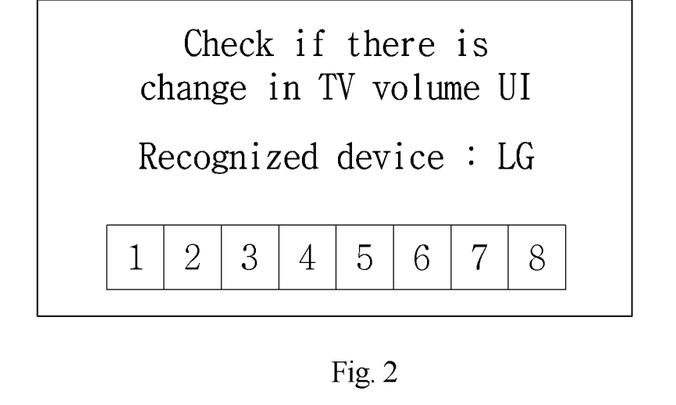
FIG. 2 shows the TV manufacturer and the code set numbers output on the TV according to the embodiment of the present disclosure.

FIG. 2 shows the TV manufacturer and the code set numbers output on the TV according to the embodiment of the present disclosure. As shown in FIG. 2, the TV shows the TV manufacturer and the IR code set numbers.

In step S130, the set-top box requests the TV to output the number "1", which corresponds to the IR code set 1 among the displayed IR code set numbers, in a different form than the other numbers respectively corresponding to the other IR code sets.

Figure 3:
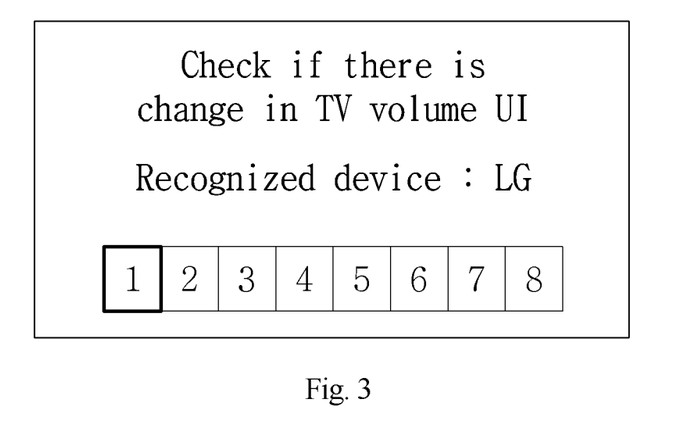
FIG. 3 shows that the number "1" is outputted in a different form than the other numbers.

FIG. 3 shows that the number "1" is outputted in a different form than the other numbers. As shown in FIG. 3, the number "1" is outputted in a different form than the other numbers.

In step S132, the set-top box transmits an IR code set 1 transmission request signal to the remote control to request the transmission of an IR signal of the IR code set 1.

In step S134, the remote control transmits the IR signal to the outside. For example, the remote control may transmit a volume-up IR signal of the IR code set 1.

In step S136, the remote control transmits, to the set-top box, an IR code set 1 transmission completion signal indicating the completion of transmission of the IR signal of the IR code set number 1.

In step S138, the set-top box requests the TV to output a screen to inquire whether the TV volume has been changed.

Figure 4:
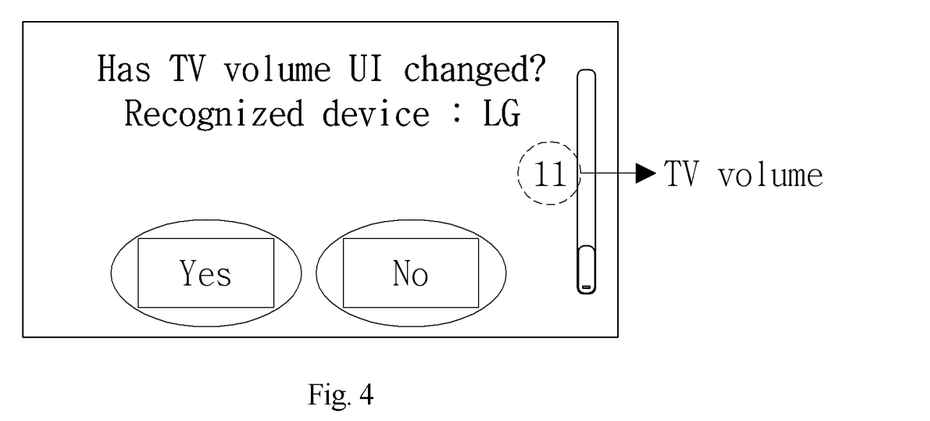
FIG. 4 shows a screen for inquiring whether a TV volume output from a TV has been changed, according to the embodiment of the present disclosure.

FIG. 4 shows the screen for inquiring whether the TV volume output from the TV has been changed, according to the embodiment of the present disclosure.

In step S140, when the TV volume has been changed, the user selects the "Yes" icon on the displayed screen with the remote control, or when the TV volume has not been changed, the user selects the "No" icon on the displayed screen with the remote control.

When the "Yes" icon on the displayed screen is selected with the remote control, the IR code set 1 is assigned as an IR code set for an IR signal for controlling the TV. Conversely, when the "No" icon on the displayed screen is selected with the remote control, the set-top box requests the TV to output the number "2", which corresponds to the IR code set 2 among the IR code sets, distinguishably from the numbers respectively corresponding to the other IR code sets.

Figure 5:
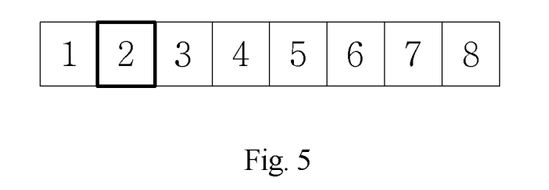
FIG. 5 shows that the number "2" is outputted in a different form than the other numbers.

FIG. 5 shows that the number "2" is outputted in a different form than the other numbers. As shown in FIG. 5, the number "2" is outputted in a different form than the other numbers.

In this way, the set-top box and the remote control perform the above-described process repeatedly, and the remote control assigns any one of the IR code sets, the IR code set 1 to the IR code set 8. According to the present disclosure, a user selects either "Yes" icon or "No" icon displayed on a TV screen, thereby assigning (setting) an IR code set to the remote control.

Figure 6A:
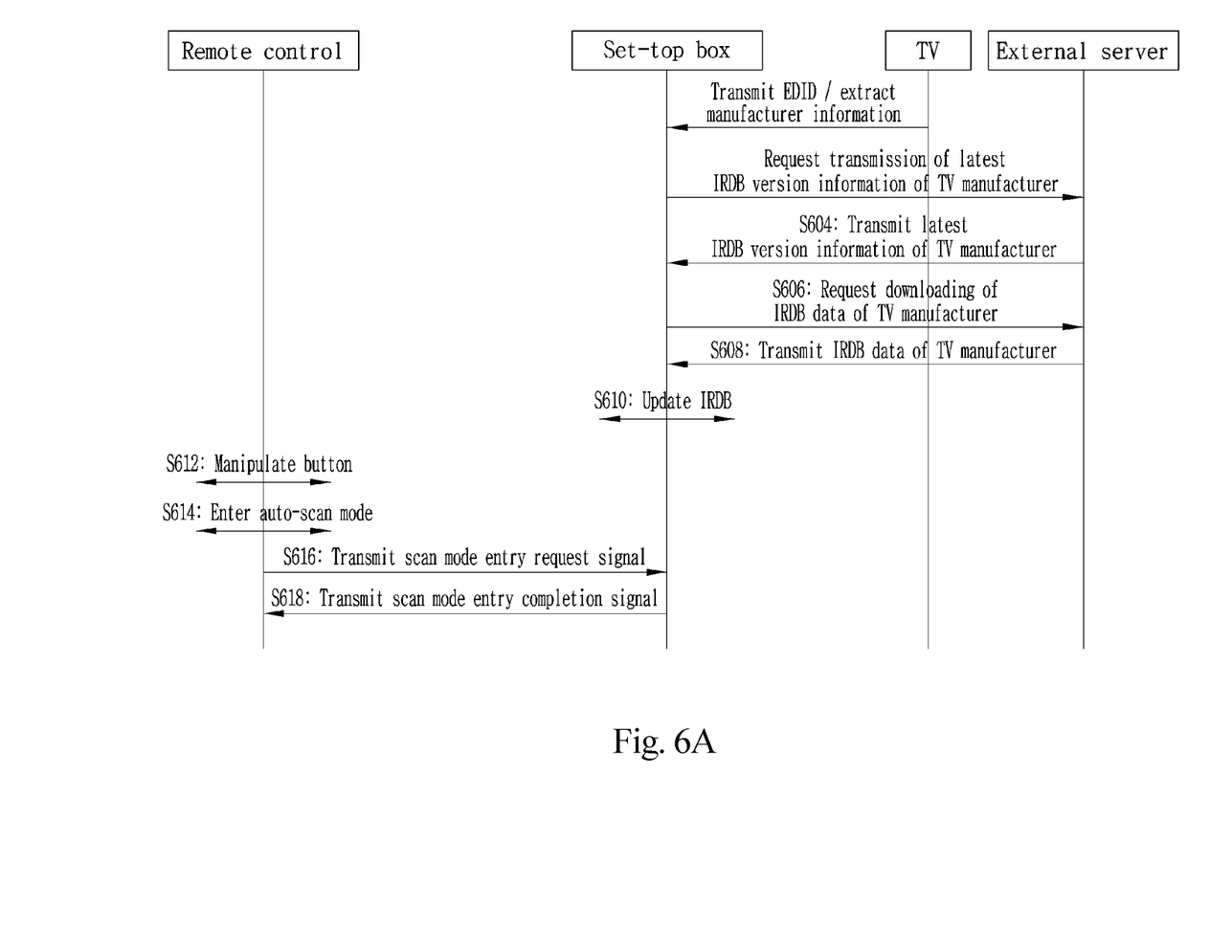
FIGS. 6A and 6B show a method of assigning an IR code set of a TV using a remote control according to another embodiment of the present disclosure.
Figure 6B:
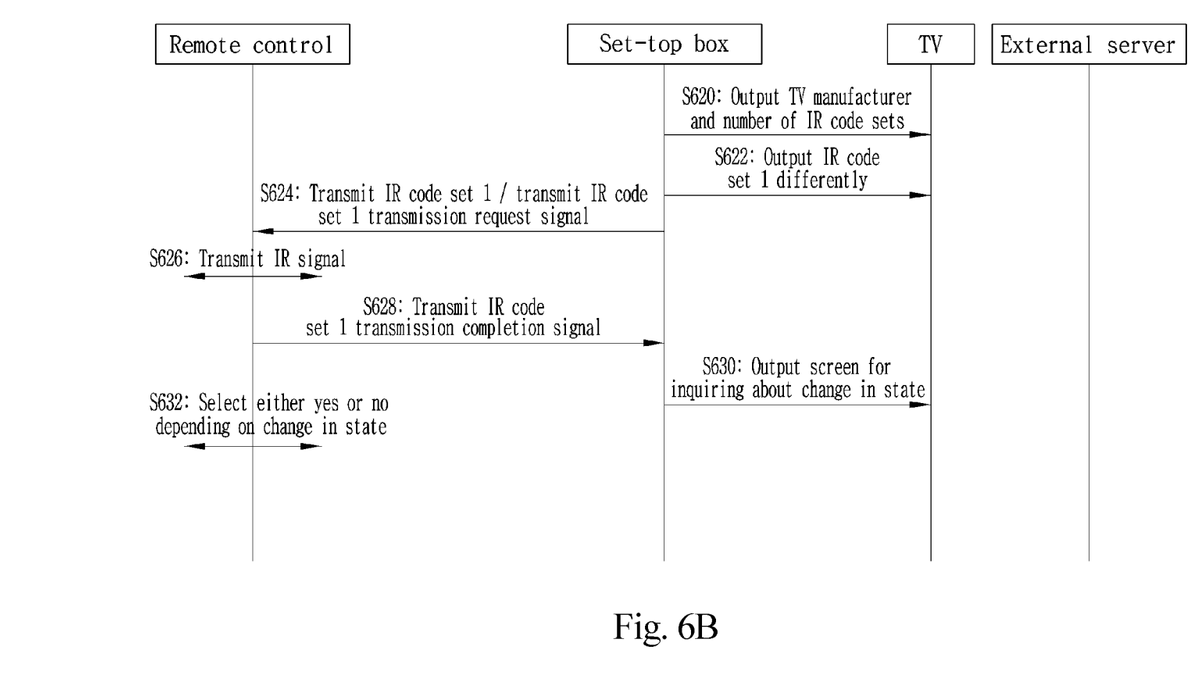

FIGS. 6A and 6B show a method of assigning an IR code set of a TV using a remote control according to another embodiment of the present disclosure. Hereinafter, the method of assigning the IR code set of the TV using the remote control according to the embodiment of the present disclosure will be described in detail with reference to FIGS. 6A and 6B.

As shown in FIGS. 6A and 6B, the method of assigning the IR code set of the TV using the remote control is performed by the operations of the remote control, a set-top box, the TV, and an external server. In particular, FIGS. 6A and 6B show a case in which an IR database (IRDB) is stored in the set-top box.

In step S600, the set-top box extracts manufacturer information of the TV connected thereto. For example, the set-top box is connected to the TV via an HDMI cable, and the TV manufacturer information is extracted from EDID information received through the HDMI cable.

In step S602, the set-top box makes a request to the external server for the latest IRDB version information of the TV.

In step S604, the external server transmits the latest version information of the TV manufacturer to the set-top box.

In step S606, the set-top box compares the version information of the stored IRDB with the IRDB version information received from the external server. When the version of the IRDB received from the external server is higher than the version of the stored IRDB, the set-top box makes a request to the external server for downloading the latest version of IRDB data.

In step S608, the external server transmits the latest version of IRDB data to the set-top box.

In step S610, the set-top box updates the stored IRDB with the received latest version of IRDB data.

In step S612, a user manipulates buttons of the remote control. Regarding the present disclosure, the buttons are at least two in number, for example, "Power+OK" buttons.

In step S614, when a button is manipulated, the remote control enters a code set auto-scan mode.

In step S616, the remote control transmits a scan mode entry request signal to the set-top box to request the entry into the code set auto-scan mode.

In step S618, the set-top box enters the scan mode and transmits, to the remote control, a scan mode entry completion signal indicating the completion of entry into the code set auto-scan mode.

In step S620, the set-top box outputs the TV manufacturer and IR code set numbers to the connected TV. For example, the remote control may inform the set-top box that the number of IR code sets is "8".

FIG. 2 shows the TV manufacturer and the code set numbers output on the TV according to the embodiment of the present disclosure.

In step S622, the set-top box requests the TV to output the number "1", which corresponds to the IR code set 1 among the displayed IR code set numbers, in a different form than the other numbers respectively corresponding to the other IR code sets.

FIG. 3 shows that the number "1" is outputted in a different form than the other numbers. As shown in FIG. 3, the number "1" is outputted in a different form than the other numbers.

In step S624, the set-top box transmits IRDB data of the IR code set 1 to the remote control. The set-top box may compress the IRDB data of the IR code set 1 and transmit the compressed IRDB data.

In step S626, the remote control transmits an IR signal to the outside. The remote control generates the IR signal using the received IRDB data of the IR code set 1, and transmits the generated IR signal to the outside. For example, the remote control may transmit a volume-up IR signal of the IR code set 1.

In step S628, the remote control transmits, to the set-top box, an IR code set 1 transmission completion signal indicating the completion of transmission of the IR signal of the IR code set number 1.

In step S630, the set-top box requests the TV to output a screen for inquiring whether the TV volume has been changed.

FIG. 4 shows the screen for inquiring whether the TV volume output from the TV has been changed, according to the embodiment of the present disclosure.

In step S632, when the TV volume has been changed, the user selects the "Yes" icon on the displayed screen with the remote control, or when the TV volume has not been changed, the user selects the "No" icon on the displayed screen with the remote control.

When the "Yes" icon on the displayed screen is selected with the remote control, the IR code set 1 is assigned as an IR code set for an IR signal for controlling the TV. Conversely, when the "No" icon on the displayed screen is selected with the remote control, the set-top box requests the TV to output the number "2", which corresponds to the IR code set 2 among the IR code sets, differently from the numbers respectively corresponding to the other IR code sets.

FIG. 5 shows that the number "2" is outputted in a different form than the other numbers. As shown in FIG. 5, the number "2" is outputted in a different form than the other numbers.

In this way, the set-top box and the remote control perform the above-described process repeatedly, and the remote control assigns any one of the IR code sets, the IR code set 1 to the IR code set 8. According to the present disclosure, a user selects either the "Yes" icon or the "No" icon displayed on a TV screen, thereby assigning (setting) an IR code set to the remote control.

Figure 7:
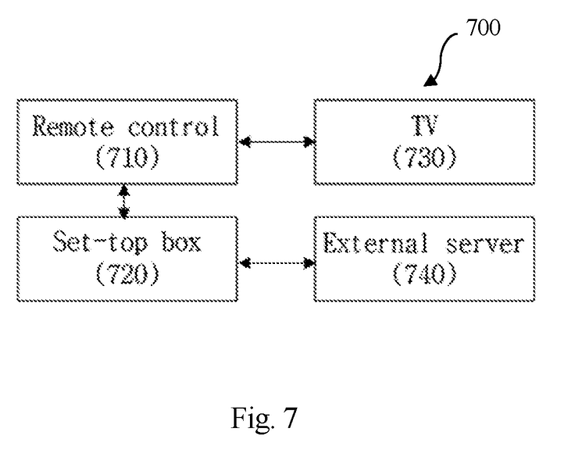
FIG. 7 shows a system for assigning an IR code set of a TV using a remote control according to an embodiment of the present disclosure.

FIG. 7 shows a system for assigning an IR code set of a TV using a remote control according to an embodiment of the present disclosure. Hereinafter, the system for assigning the IR code set of the TV using the remote control according to the embodiment of the present disclosure will be described in detail with reference to FIG. 7.

The system 700 for assigning the IR code set of the TV using the remote control includes the remote control 710, a set-top box 720, the TV 730, or an external server 740. Other configurations besides the aforementioned configuration may be included in the system 700, proposed in the present disclosure, for assigning the IR code set of the TV.

In addition, the present disclosure is described as using a remote control, but other devices besides the remote control may be used, and other devices besides the set-top box may be used.

Regarding the present disclosure, the remote control 710 assigns an IR code set differently depending on whether the remote control 710 stores an IRDB therein or not. If the IRDB is not stored in the remote control, the IRDB may be stored in the set-top box.

The remote control 710 transmits IRDB version information stored therein to the set-top box 720 via a wireless communication. The remote control 710 updates the stored IRDB with IRDB data received from the set-top box 720. When a set button is manipulated, the remote control 710 enters a code set auto-scan mode.

The remote control 710 that has entered the code set auto-scan mode transmits a scan mode entry request signal to the set-top box, and receives a scan mode entry completion signal corresponding to the scan mode entry request signal from the set-top box 720.

When an IR code set transmission request signal is received from the set-top box, the remote control 710 transmits an IR signal generated with a particular IR code set to the outside. After transmitting the IR signal to the outside, the remote control 710 transmits an IR code set transmission completion signal corresponding to the IR code set transmission request signal to the set-top box 720.

Either the "Yes" icon or the "No" icon displayed on the TV is selected with the remote control 710. When the TV state has been changed in response to the transmitted IR signal, the "Yes" icon is selected. When the TV state has not been changed, the "No" icon is selected. When the "Yes" icon on the displayed screen is selected with the remote control 710, the IR code set 1 is assigned as an IR code set for an IR signal for controlling the TV.

In addition, if the remote control does not store the IRDB therein as described above, the remote control 710 receives an IR code set transmission request signal containing IR code set data corresponding to each IR code set from the set-top box 720.

The set-top box 720 includes a transceiver and is wirelessly or wiredly connected to the remote control 710 and the TV 730. The set-top box 720 is also connected to the external server via the internet. The set-top box 720 further includes a network interface to receive signals from and to send signals to a network and a processor to convert the signals for the TV 730.

The set-top box 720 extracts TV manufacturer information of the connected TV from the EDID information. The set-top box 720 makes a request to the external server 740 for IRDB version information of the TV manufacturer, and receives the IRDB version information from the external server.

When the version of the IRDB received from the external server 740 is higher than the version of the stored IRDB or the version of the IRDB received from the remote control 710, the set-top box 720 downloads IRDB data from the external server 740 and stores the IRDB data. The set-top box 720 transmits the IRDB data to the remote control when necessary.

When the set-top box 720 receives a scan mode entry request signal from the remote control 710, the set-top box 720 enters an IR code set scan mode for scanning IR code sets. The set-top box 720 transmits a scan mode entry completion signal corresponding to the scan mode entry request signal to the remote control 710.

The set-top box 720 requests the connected TV to output the TV manufacturer and IR code set numbers. The set-top box 720 requests the TV to output the number corresponding to a particular IR code set among the displayed IR code set numbers in a different form than the numbers respectively corresponding to the other IR code sets.

The set-top box 720 transmits an IR code set transmission request signal to the remote control 710 and receives an IR code set transmission completion signal corresponding to the IR code set transmission request signal. The set-top box 720 may include IRDB data corresponding to a particular IR code set in the IR code set transmission request signal.

The TV 730 is connected to the remote control 710 or the set-top box 720. The TV 730 transmits the EDID information to the set-top box 720. The TV 730 outputs the TV manufacturer and the IR code set numbers in response to a request from the set-top box. The TV 730 performs the operation corresponding to the IR signal transmitted by the remote control. When the assigned IR code set is different from the IR code set of the IR signal transmitted by the remote control, the TV 730 does not perform the operation. When the IR code sets are the same, the TV 730 performs the operation.

The external server 740 is connected to the set-top box 730 and transmits the IRDB version information of the TV manufacturer and the IRDB data to the set-top box 730. In addition, the external server 740 may transmit various types of information to the set-top box 720.

The present disclosure has been described with reference to an exemplary embodiment illustrated in the drawings for illustrative purposes, and those skilled in the art will understand that the present disclosure may be modified in various ways and that other equivalent embodiments are possible.

What is claimed is:

1. A method of assigning an IR code set of a TV using a remote control, the method comprising:
   entering, by the remote control, a code set auto-scan mode when a set button is manipulated, and transmitting a scan mode entry request signal for requesting entry into the code set auto-scan mode to a set-top box;
   entering, by the set-top box, the code set auto-scan mode in response to the scan mode entry request signal, and transmitting a scan mode entry completion signal corresponding to the scan mode entry request signal to the remote control;
   outputting, by the set-top box, the number of a plurality of the IR code sets of an IR database (IRDB) received from the remote control on the TV;
   transmitting, by the set-top box to the remote control, an IR code set transmission request signal for requesting transmission of an IR signal of any one particular IR code set among the IR code sets, which are at least two in number, constituting the IRDB; and
   transmitting, by the remote control, the IR signal of the particular IR code set.

2. The method of claim 1, further comprising
   after the transmitting of the IR signal, assigning, by the remote control, the particular IR code set as the IR code set for controlling the TV when a state of the TV is changed in response to the transmitted IR signal.

3. The method of claim 2, wherein in the outputting of the number of the IR code sets on the TV, when the number of the IR code sets is n, numbers from 1 to n are listed, wherein n is a natural number greater than 1.

4. The method of claim 3, wherein in the transmitting of the IR code set transmission request signal for requesting transmission of the IR signal of the particular IR code set, the TV is requested to output the number corresponding to the particular IR code set distinguishably from the number corresponding to the other IR code set.

5. The method of claim 1, further comprising:
before the transmitting of the scan mode entry request signal, receiving, by the remote control, the IRDB including the at least two IR code sets from the set-top box.

6. The method of claim 5, wherein before the receiving of the IRDB, when a version of the IRDB stored in the remote control is lower than a version of the IRDB received from an external server, the set-top box transmits the IRDB to the remote control.

7. The method of claim 1, wherein in the transmitting of the IR code set transmission request signal for requesting transmission of the IR signal, code set data of the particular IR code set is transmitted to the remote control.

8. The method of claim 1, wherein after the transmitting of the IR signal of the particular IR code set by the remote control, the remote control transmits, to the set-top box, an IR code set transmission completion signal indicating that the IR signal has been transmitted.

\* \* \* \* \*